Figure 1:
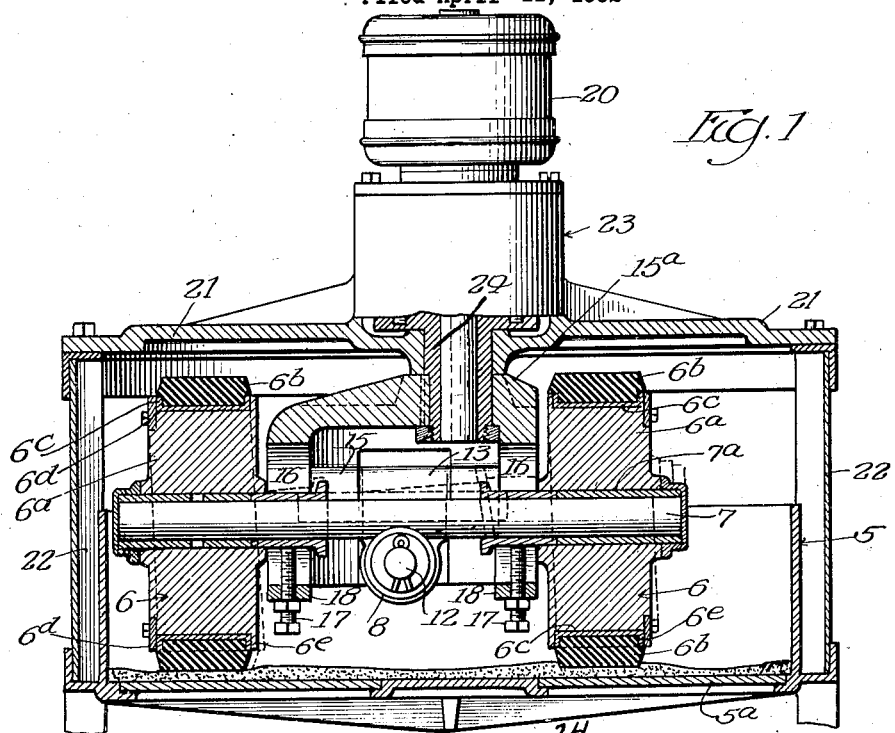

Oct. 31, 1933.     W. F. PIPER     1,933,278
METHOD OF PREPARING MOLDING SAND
Filed April 11, 1932

Inventor
Walter F. Piper
By Fred Gerlach his Atty.

Patented Oct. 31, 1933

1,933,278

UNITED STATES PATENT OFFICE 1,933,278

METHOD OF PREPARING MOLDING SAND

Walter F. Piper, Oak Park, Ill., assignor to The Beardsley & Piper Company, Chicago, Ill., a corporation of Illinois Application April 11, 1932. Serial No. 604,492

2 Claims. (Cl. 22—217)

The invention relates to the preparation of sand for use in producing molds for metal founding.

In the preparation of sand for molding purposes, it is necessary mechanically to mix the sand or grains of silica with a bonding material, such as clay and moisture to impart to the mass, when it is packed in a flask, the required bond strength or stability.

A desideratum in the preparation of the sand is to coat uniformly each grain of silica with a thin film of the bonding agent, sufficient to give the mass of sand the necessary stability for molding without reducing the permeability that is necessary to permit the escape of gases from the metal through the mass of sand while casting the metal. Complete and uniform coating of each grain of silica with a thin film of clay develops the requisite stability of the mixture. The less the bonding agent the greater the permeability of the mass. When the grains of silica are uniformly coated with the minimum bonding agent, the desired stability will be attained with spaces between the coated grains to provide the necessary permeability for the escape of gases during the casting operation. When the mass of sand has the requisite stability with the minimum of bonding agent, and the requisite permeability, and the bonding agent is uniformly distributed, a high quality of castings will result, and castings of poor quality, dirty castings, and scrap losses will be reduced to the minimum.

When the coating on the silica grains is uneven, the more heavily bonded grains present will decrease the permeability in spots and produce scabs, blows, and a high percentage of scrap. If the grains of silica are broken down or crushed to an excessive degree, the mass will lack the necessary permeability to produce good castings. The under-bonded portions of the sand, when there is uneven distribution of the bonding agent, will produce excessive permeability so the metal will penetrate the spaces between the grains of sand and produce rough surfaced castings.

For these reasons, molding sand, in which the grains of silica are evenly coated with a film of bonding agent sufficient for the requisite stability of the mass with evenly distributed spaces between the grains for the requisite permeability, results in sound, clean castings with the minimum of scrap losses. Heretofore, it has been customary, in the preparation of synthetic sand for founding, to mull the sand between relatively movable elements having metallic faces, usually one or more metal faced muller wheels and a bed or pan over which the wheels are operated.

In the operation of these mullers the silica will cause these metallic faces of the muller wheels to be worn smooth and become polished. When that occurs, the polished peripheries will tend to slip over or deflect the sand in lieu of rolling over it to subject the sand to the desired rubbing action between the mulling elements and to attain uniform distribution of the bonding agent around the grains of silica. In practice I have discovered that when a muller wheel with a metallic tread is used for molding sand, the sand banks up in front of the wheel and a large portion of the sand, in lieu of being worked under the wheels, will be deflected laterally of the wheels without being mulled. This sliding of the silica grains across the faces of the wheels has a tendency to rub the film of bond from those portions of the grains of silica which have sliding contact with the peripheries of the wheels, in lieu of distributing the bonding agent around these grains.

This slipping or skidding of the sand under the peripheries of the metallic faced wheels, besides not being conducive to uniform coating of the grains, causes severe wear on the tread of the wheels, so that the treads of the mulling wheels must be frequently replaced. Furthermore, this slipping or skidding of the sand increases the time it is necessary to keep the sand in the muller.

The primary object of the present invention is to provide a method of treating moulding sand by which the bonding agent is uniformly distributed throughout the mass of the sand, and each grain of silica is uniformly coated with a film of the bonding agent so that the mass will have the requisite stability and permeability to produce good clean castings.

Another object of the invention is to provide a method by which the duration of the treatment necessary to mull or mix the sand thoroughly with the bonding agent may be reduced.

A still further object of the invention is to produce a method for treating the molding sand by which the likelihood of crushing the grains of silica, which will destroy the permeability of the mass, will be avoided.

A still further object of the invention is to provide a method of treating molding sand to overcome the wear on the mulling elements.

These objects are attained primarily by passing the sand between coacting mulling elements, one of which is rotatable relatively to the other, and in which one of the mulling elements has its sand-engaging surface formed of elastic material, such as rubber. In practice I have found that when at least one of the mulling elements has a sand engaging face of elastic material of a density corresponding to that used for vehicle tires, it has sufficient friction to carry the sand between the wheel and its coacting element in lieu of skidding through or over a considerable portion of the sand. By eliminating this skidding or sliding, the silica grains will be rubbed together to coat them more uniformly with the minimum film of bond necessary for the stability of the mass and to leave the spaces between the coated grains for the requisite permeability when casting. The elasticity of the sand-engaging face also tends to avoid crushing of the grains of silica to such an extent as to destroy the permeability of the mass of sand.

In practice I have found that when idle muller wheels are used with rubber sand-engaging treads, the wheels will revolve ten per cent more than when the treads are formed of metal. This increase of revolution expedites the mulling operation.

It has also been found, in practice, that elimination of slippage between the muller wheels and the sand reduces the wear of the tread so that the rubber treads will not require replacement as frequently as steel treads.

With these objects in view, the invention consists primarily in preparing synthetic sand for founding by mulling it with the desired bonding agents and moisture between elements, at least one of which has a sand-engaging surface of elastic material, such as rubber, which will have sufficient friction to carry the sand between the mulling elements, so the grains of silicia will be rubbed together to distribute uniformly the bonding agent without substantially disintegrating or crushing the grains of silica.

The invention consists in the several novel features hereinafter set forth and more particularly defined by claims at the conclusion hereof.

Figure 2:
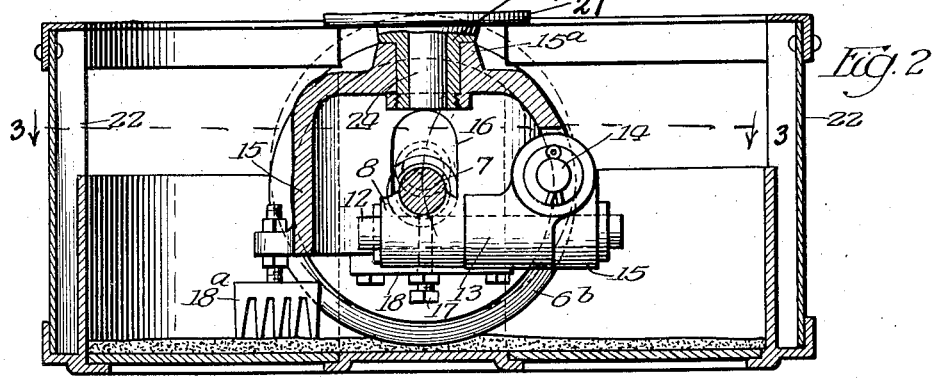
Figure 3:
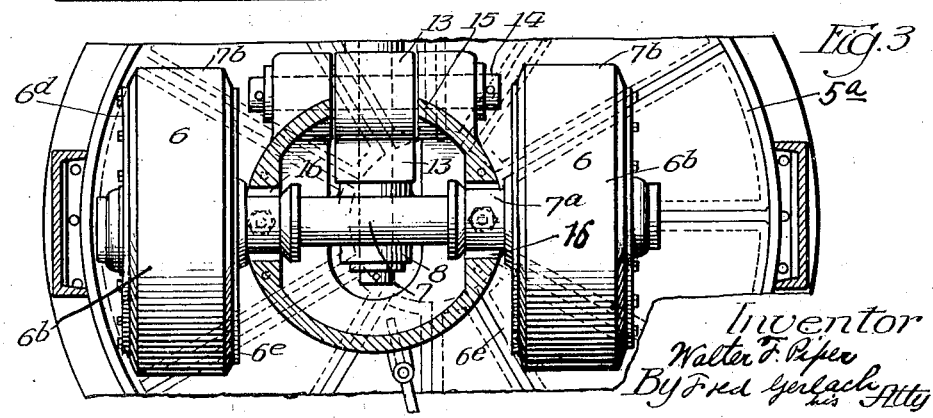

In the drawing which accompanies and forms a part of the present specification or disclosure and in which like numerals of reference denote corresponding parts throughout the several views: Figs. 1 and 2 are vertical sections of a mulling apparatus for carrying out the improved method, such sections being taken at right angles to one another; and Fig. 3 is a horizontal section on the line 3—3 of Figure 2.

The method or process which forms the subject matter of the invention has reference to the treatment of molding sand and is adapted to be carried out in an apparatus comprising a pan wit a cylindrical side wall 5 and a bottom 5ᵃ. A batch of silica sand and a bonding agent, consisting of a suitable clay, moisture and usually sea coal in the proper proportions, are placed in the pan; for example, approximately eighty-five per cent silica sand and fifteen per cent of bonding material. The sand and bonding material are shovelled or otherwise introduced into this pan. A pair of muller wheels 6 are rotatably mounted on a substantially horizontal axle which is not rotatable on its own axis, and is bodily rotatable to cause the wheels 6 to travel in circular paths over the bottom of the pan.

Each wheel 6 comprises a body 6ᵃ of metal, which is journalled on a bearing sleeve 7ᵃ carried by the axle, a solid rubber tire 6ᵇ of the density usual in vehicle tires, a demountable rim 6ᶜ, in which the tire is held, and removable screw clamps 6ᵈ which are adapted to secure the rim against the flange 6ᵉ on the inner side of the wheel body. These wheels are of sufficient weight to exert, when rolled over the sand on the bed of the pan, the desired pressure to rub the grains of silica together to coat them evenly with the bonding material, and effect an even distribution of the bond throughout the mass. The rubber tires or treads 6ᵇ are of sufficient thickness to avoid any crushing pressure against the sand and also to permit considerable wear.

To support the rubber tired wheels so they are free to rise and fall in the pan and to prevent crushing of the sand, particularly when it is unevenly distributed over the bottom of the pan, axle 7 has a pendent lug 8 which is pivoted on a pin 12 which extends at right angles to the axle 7 so the latter is free to rock longitudinally and permit one wheel to rise and the other to drop as they ride over irregular formations of the mass of sand in the pan. The pin 12 is mounted in a bracket 13 which is pivoted on a pin 14 which has its axis substantially parallel to the axle 7. Pivot pin 14 is mounted in a horizontally revoluble frame 15 which has vertical slots 16 through which the axle extends and is adapted to bodily rotate the axle approximately in a horizontal plane. This bodily movement of the axle causes the wheels 6, which are loose on the axle, to roll over the material in the pan. The pivot pin 14 permits the axle 7 to rise and fall bodily as the wheels 6 travel over the sand. Wheels 6 are differently spaced from the vertical axis of the revoluble frame 15 to operate on the sand in different portions of the pan. Set screws 17, which pass through plates 18 which are fixed to the bottom of revoluble frame 15, limit the movement of the rubber peripheries of the wheels 6 to prevent the crushing of the grains of silica when the bed of sand or spots therein are thin. A plow 19 is carried by the frame 15 to loosen and turn over the sand after it has been rubbed between the wheels and the bed and so the sand will not become packed on the pan.

The frame 15 is driven to operate the axle 7 to impart to the wheels planetary movements as they ride over the sand in the pan, by a suitable speed reducing gearing contained in a housing 23 and an electric motor 20 which is mounted on said housing. A bar 21, which is supported by a suitable framework 22, supports the housing 23 and motor 22. The hub 15ᵃ of frame 15 is keyed to the lower end of low speed shaft 24 of the reducing gearing in housing 23. The rotation of shaft 24 will bodily rotate the frame 15 and axle 7 and cause the wheels 6 to roll in circular paths over the mass in the pan. In this operation, the wheels 6 are free to rise and fall together separately through the pivot-pins 12, 14, and the range of movement is limited by set screws 17 so the wheels cannot crush the grains of silica in the pan.

While the wheels 6 are operated, their elastic rubber treads 6ᵇ, in rolling over the mass, have sufficient frictional properties to cause the grains of silica to be carried under the wheels. This causes the grains of silica to be rubbed together, and this rubbing action causes the bonding material to be thinly coated around the grains of silica. It also causes the bonding agent to be uniformly worked and distributed throughout the mass so there will be no spots with excessive or deficient bonding properties. This distribution of the bonding agent produces moulding sand which possesses the requisite stability and permeability for good castings. It also reduces scabs which result from fusion of the bonding clay with the metal in casting, blow, and the percentage of scrap metal.

The rubber treads on the wheels 6 practically overcome the slipping or skidding of the muller wheels over the sand in the pan, which results when wheels with steel treads or sand-engaging surfaces are used. The wheels are caused to rotate more regularly when rubber tires are used, than when steel tires are used. In practice, it has also been found that less abrasion or wear results when the grains of silica are frictionally engaged by rubber than by steel.

The invention exemplifies a method of preparing synthetic sand for molding, which by reason of the efficient rubbing action attained by relatively movable coacting sand-engaging faces, at least one of which has the properties of rubber, results in a substantially uniform coacting of the grains of silica with the bonding agent, and an even distribution throughout the mass of sand. The sand thus treated has the requisite stability and permeability for producing good castings and practically eliminating scabs and blows and reducing the scrap loss. The necessary period of treatment for efficient mulling is less than when the mulling is done between metallic mulling elements. The wear of the rubber sand-engaging face has been found to be less than that which occurs when the wheels have steel treads.

This application is a continuation in part of an application for Letters Patent filed by me February 15, 1930, Serial No. 428,586.

Having thus described the invention, what I claim as new and desire to secure by Letters Patent, is:

1. That improvement in the preparation and treatment of sand for molding which consists in combining molding sand and bonding material and then elastically and frictionally gripping some of the grains of sand and producing such relative movement between the gripped grains of sand and other grains in the mass that the bonding material is evenly distributed throughout the mass and the grains of sand are uniformly coated with the material without being crushed.

2. That improvement in the preparation and treatment of sand for molding which consists in combining molding sand and bonding material and then moving over the mass a muller element with an elastic friction tread in such manner that the grains of sand are gripped elastically and frictionally and are rubbed together without crushing to effect an even and uniform coating thereof with the bonding material.

WALTER F. PIPER.